United States Patent
Okuni et al.

(10) Patent No.: US 9,954,702 B2
(45) Date of Patent: Apr. 24, 2018

(54) RADIO COMMUNICATION DEVICE AND RADIO COMMUNICATION METHOD

(71) Applicant: KABUSHIKI KAISHA TOSHIBA, Minato-ku (JP)

(72) Inventors: Hidenori Okuni, Yokohama (JP); Akihide Sai, Kawasaki (JP); Masanori Furuta, Odawara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/415,320

(22) Filed: Jan. 25, 2017

(65) Prior Publication Data
US 2017/0134198 A1 May 11, 2017

Related U.S. Application Data

(63) Continuation of application No. PCT/JP2015/071557, filed on Jul. 29, 2015.

(30) Foreign Application Priority Data

Aug. 7, 2014 (JP) .................................. 2014-161800

(51) Int. Cl.
H04L 27/227 (2006.01)
H04L 7/04 (2006.01)
(Continued)

(52) U.S. Cl.
CPC ............ *H04L 27/227* (2013.01); *H04L 7/041* (2013.01); *H04L 27/144* (2013.01); *H04L 27/152* (2013.01)

(58) Field of Classification Search
CPC ... H04L 27/22; H04L 27/144; H04L 27/1525; H04L 27/156; H04L 27/2003; H04L 27/227; H04L 27/3818
(Continued)

(56) References Cited

U.S. PATENT DOCUMENTS 4,389,665 A * 6/1983 Nagao .................. H04N 11/146
                                                            348/666
4,835,792 A * 5/1989 Davarian ................. H03D 5/00
                                                            329/300
(Continued)

FOREIGN PATENT DOCUMENTS

JP          56-4961        1/1981
JP          59-186452      10/1984
(Continued)

OTHER PUBLICATIONS

International Search Report dated Sep. 1, 2015 in PCT/JP2015/071557, filed on Jul. 29, 2015.

*Primary Examiner* — Emmanuel Bayard
(74) *Attorney, Agent, or Firm* — Oblon, McClelland, Maier & Neustadt, L.L.P.

(57) ABSTRACT

A radio communication device has a local oscillator to generate a local signal, a first mixer to mix a binary continuous phase frequency shift keying signal and the local signal so as to generate a baseband signal, a first filter to remove an unnecessary frequency component included in the baseband signal, a delay device to delay an output signal of the first filter by one symbol, and a wave detector to demodulate the continuous phase frequency shift keying signal, wherein a modulation index m of the continuous phase frequency shift keying signal is a value expressed by $m=n+k$ where $0<n<1$ is satisfied and k is an integer of 0 or more, and a frequency of the local signal is a frequency shifted by a frequency corresponding to 0 or 1 of the continuous phase frequency shift keying signal.

18 Claims, 9 Drawing Sheets

(51) Int. Cl.
*H04L 27/152* (2006.01)
*H04L 27/144* (2006.01)

(58) Field of Classification Search
USPC .............................. 375/316, 323–326, 340
See application file for complete search history.

(56) References Cited

U.S. PATENT DOCUMENTS

| | | | | |
|---|---|---|---|---|
| 5,014,283 | A * | 5/1991 | Baier | H04L 27/22 333/18 |
| 5,170,131 | A | 12/1992 | Takahiro et al. | |
| 5,278,514 | A * | 1/1994 | Chihara | H04L 27/2338 329/302 |
| 5,602,877 | A * | 2/1997 | Boccuzzi | H03D 3/007 329/300 |
| 5,883,930 | A | 3/1999 | Fukushi | |
| 6,343,209 | B1 * | 1/2002 | Maeda | H03D 7/161 348/731 |
| 7,333,569 | B2 * | 2/2008 | Jun | H04L 27/066 375/326 |
| 8,374,291 | B1 * | 2/2013 | Himsoon | H04L 27/22 375/340 |
| 8,615,064 | B2 | 12/2013 | Sai | |
| 9,137,066 | B2 * | 9/2015 | Linn | H04L 27/3818 |
| 2002/0060604 | A1 * | 5/2002 | Hammes | H04L 25/03197 329/300 |
| 2003/0202620 | A1 * | 10/2003 | Stevenson | H04L 27/2276 375/334 |
| 2005/0089120 | A1 * | 4/2005 | Quinlan | H04L 27/156 375/335 |
| 2006/0056546 | A1 * | 3/2006 | Hayase | H03D 3/245 375/332 |
| 2007/0002932 | A1 * | 1/2007 | Shirai | G01S 7/292 375/141 |
| 2008/0118002 | A1 * | 5/2008 | Fonseka | H04L 27/2025 375/298 |
| 2010/0034318 | A1 * | 2/2010 | Lui | H04L 27/2334 375/324 |
| 2010/0118849 | A1 * | 5/2010 | Kimura | H04L 27/2655 370/338 |
| 2011/0080195 | A1 * | 4/2011 | Orino | H03J 7/04 327/155 |

FOREIGN PATENT DOCUMENTS

| | | |
|---|---|---|
| JP | 60-119156 | 6/1985 |
| JP | 62-222744 | 9/1987 |
| JP | 2-76348 | 3/1990 |
| JP | 4-172840 | 6/1992 |
| JP | 5-91150 | 4/1993 |
| JP | 2877198 | 3/1999 |
| JP | 2010-183285 | 8/2010 |

\* cited by examiner

RADIO COMMUNICATION DEVICE AND RADIO COMMUNICATION METHOD

CROSS REFERENCE TO RELATED APPLICATIONS

This application is based upon and claims the benefit of priority from the prior Japanese Patent Application No. 2014-161800, filed on Aug. 7, 2014, the entire contents of which are incorporated herein by reference.

FIELD

Embodiments of the present disclosure relate to a radio communication device and a radio communication method that receive a continuous phase frequency shift keying signal.

BACKGROUND

A conventional receiver for a continuous phase frequency shift keying signal repeatedly, successively adds 0, $+\pi/2$, $+2\pi/2$, and $+3\pi/2$ to phase information of a Gaussian minimum shift keying (GMSK) signal so as to facilitate processing at a subsequent stage with the GMSK signal regarded as a binary phase shift keying (BPSK) signal.

However, the conventional receiver detects the phase information of the signal by mutually using an in-phase signal and a quadrature signal so that there is a problem that power consumption is large.

DETAILED DESCRIPTION

According to one embodiment, a radio communication device has a local oscillator to generate a local signal, a first mixer to mix a binary continuous phase frequency shift keying signal and the local signal so as to generate a baseband signal, a first filter to remove an unnecessary frequency component included in the baseband signal, a delay device to delay an output signal of the first filter by one symbol, and a wave detector to demodulate the continuous phase frequency shift keying signal by using the output signal of the first filter and an output signal of the delay device.

wherein a modulation index m of the continuous phase frequency shift keying signal is a value expressed by m=n+k where 0<n<1 is satisfied and k is an integer of 0 or more, and a frequency of the local signal is a frequency shifted by a frequency corresponding to 0 or 1 of the continuous phase frequency shift keying signal, from a carrier frequency of the continuous phase frequency shift keying signal.

Embodiments of the present disclosure will be described below with reference to the drawings. A distinguishing configuration and operation thereof in a receiver to be provided in a radio communication device, will be mainly described in each of the following embodiments, but the receiver may include an omitted configuration and operation thereof in the following descriptions. Note that, the scope of the present embodiments includes the omitted configuration and the operation. The radio communication device according to each of the following embodiments may include only the receiver, or may include a configuration, such as a transmitter, other than the receiver. The radio communication device may be a stationary communication device or a portable radio terminal.

First Embodiment

A receiver in a radio communication device according to a first embodiment is to perform demodulation processing with a binary continuous phase frequency shift keying signal, such as a GMSK signal, regarded as a BPSK signal.

Figure 1:
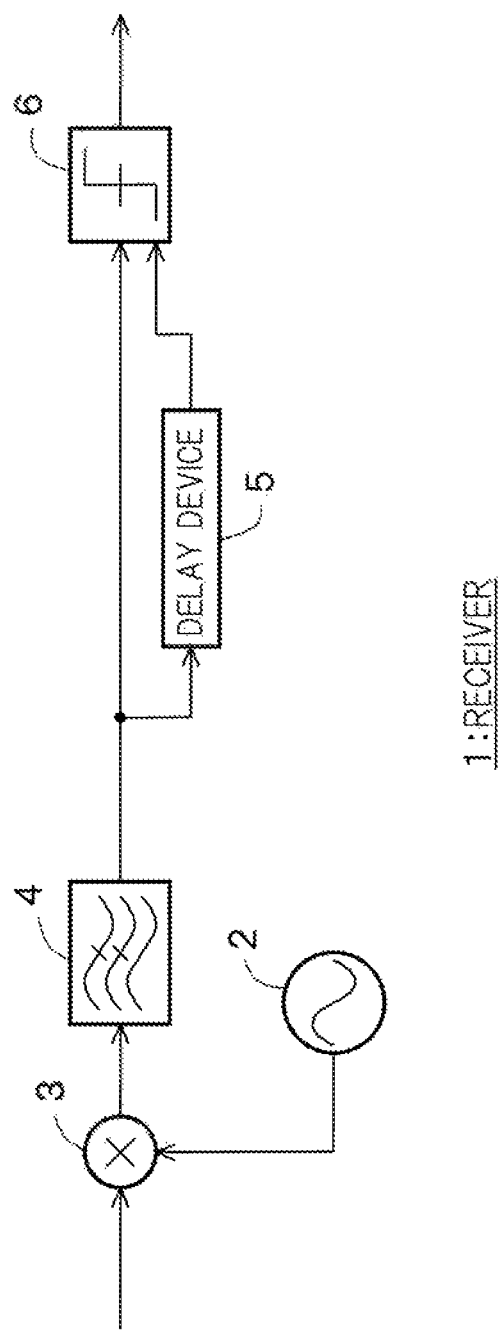
FIG. 1 is a block diagram of an internal configuration of a receiver according to a first embodiment.

FIG. 1 is a block diagram of an internal configuration of the receiver 1 in the radio communication device according to the first embodiment. The receiver 1 in FIG. 1 includes a local oscillator 2, a first mixer 3, a first filter 4, a delay device 5, and a wave detector 6.

The local oscillator 2 generates a local signal. A frequency of the local signal is a frequency that has been shifted by a frequency corresponding to 0 or 1 of the continuous phase frequency shift keying signal, from a carrier frequency of the continuous phase frequency shift keying signal input to the receiver 1.

The first mixer 3 mixes the input continuous phase frequency shift keying signal and the local signal so as to generate a baseband signal.

The first filter 4 removes an unnecessary frequency component included in the baseband signal. Here, the unnecessary frequency component is a frequency component unnecessary in processing the baseband signal and is, for example, a frequency component irrelevant to a frequency band of a reception signal. The delay device 5 delays an output signal of the first filter 4 by one symbol. The wave detector 6 demodulates the continuous phase frequency shift keying signal by using the output signal of the first filter 4 and an output signal of the delay device 5.

The continuous phase frequency shift keying signal s(t) is expressed by Expression (1) below:

$$s(t) = A \cos[2\pi f_c t + \varphi(t)] \quad (1)$$

where A represents amplitude, $f_c$ represents the carrier frequency, and $\varphi(t)$ represents a phase of modulated signal.

A frequency shift f(t) is expressed by Expression (2) below:

$$f(t) = \frac{1}{2\pi}\frac{d\phi(t)}{dt} = \frac{\Delta f}{2}\sum_k a_k u(t - kT) \quad (2)$$

where $a_k$ represents a code string that acquires +1 and −1 corresponding to a mark and a space of a k-th symbol, T represents a symbol interval, $f_1$ represents a frequency shift corresponding to the mark frequency, $f_0$ represents a frequency shift corresponding to the space frequency, $\Delta f$ represents a difference therebetween, and is defined as $\Delta f = |f_1 - f_0|$.

u(x) on the right side of Expression (2) is expressed by Expression (3) below:

$$u(x) = \begin{cases} 1; & 0 < x \leq T \\ 0; & \text{otherwise} \end{cases} \quad (3)$$

Based on Expression (1), a phase shift $\varphi(t)$ is expressed by Expression (4) below:

$$\phi(t) = \pi\Delta f \int_{-\infty}^{t} \sum_k a_k u(x - kT)\, dx \quad (4)$$

Expression (4) is replaced by Expression (5):

$$\phi(t) = \frac{m\pi}{T}\int_{-\infty}^{t}\sum_{k=-\infty}^{\infty} a_k u(x - kT)\, dx \quad (5)$$

where a modulation index m is defined as the following expression: $m = \Delta f/T$.

The local oscillator 2 generates the local signal having a frequency shifted by $\Delta f/2 (=f_1)$ or $-\Delta f/2 (=f_2)$ from the carrier frequency $f_c$.

The first mixer 3 mixes the local signal generated by the local oscillator 2 and the continuous phase frequency shift keying signal expressed by Expression (1) described above so as to generate and input the baseband signal to the first filter 4. A signal $r_{mix}(t)$ after the mixing is expressed by Expression (6) below:

$$r_{mix}(t) = A\cos[2\pi f_c t + \phi(t)] \cdot \cos[2\pi f_c t \pm \pi\Delta f t] \quad (6)$$

$$= \frac{A}{2}\{\cos[\phi(t) \mp \pi\Delta f t] + \cos[4\pi f_c t + \phi(t) \pm \pi\Delta f t]\}$$

The first filter 4 removes a harmonic component of the signal $r_{mix}(t)$ after the mixing and a signal out of a signal band. The output signal $r_{filter}(t)$ of the first filter 4 is expressed by Expression (7) below:

$$r_{filter}(t) = \frac{A}{2}\cos[\phi(t) \mp \pi\Delta f t] \quad (7)$$

$$= \frac{A}{2}\cos\left[\pi\Delta f \int_{-\infty}^{t}\sum_k a_k u(x - kT)\, dx \mp \pi\Delta f t\right]$$

$$= \frac{A}{2}\cos\left[\frac{m\pi}{T}\left[\int_{-\infty}^{t}\sum_k a_k u(x - kT)\, dx \mp t\right]\right]$$

A phase difference of the output signal $r_{filter}(t)$ in one symbol section between $t=(k-1)T$ and $t=kT$, is expressed by Expression (8) below.

$$\varphi_{filter}(k) - \varphi_{filter}(k-1) = \pi m(a_k \mp 1) \quad (8)$$

When the first mixer 3 performs the mixing with the local signal having a frequency shifted by $+\Delta f/2(=f_1)$ from the carrier frequency $f_c$, the phase difference in the one symbol section is expressed by Expression (9) below.

$$\phi_{filter}(k) - \phi_{filter}(k-1) = \begin{cases} 0; & a_k = 1 \\ -2\pi m; & a_k = -1 \end{cases} \quad (9)$$

When the first mixer 3 performs the mixing with the local signal having a frequency shifted by $-\Delta f/2(=f_2)$ from the carrier frequency $f_c$, the phase difference in the one symbol section is expressed by Expression (10) below.

$$\phi_{filter}(k) - \phi_{filter}(k-1) = \begin{cases} 2\pi m; & a_k = 1 \\ 0; & a_k = -1 \end{cases} \quad (10)$$

As indicated in Expression (10), when the first mixer 3 performs the mixing with the local signal having a frequency shifted by $-\Delta f/2(=f_2)$ from the carrier frequency $f_c$, no phase rotates in a case where the signal is −1, and a phase of 2 nm rotates in a case where the signal is 1.

Figure 2A:
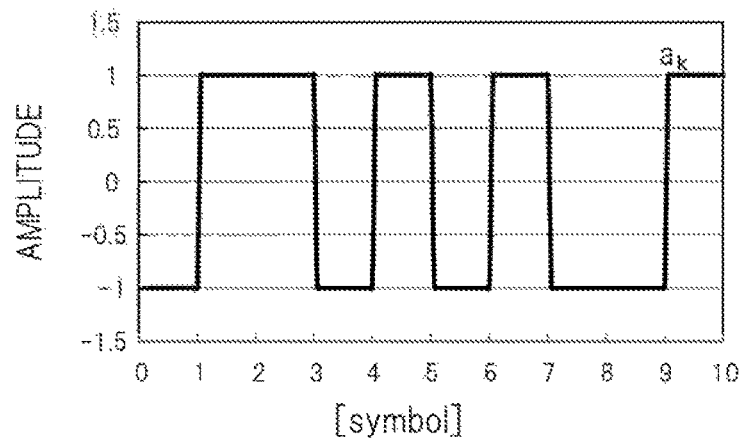
FIG. 2A is a graphical representation of a code string of $a_k$.
Figure 2B:
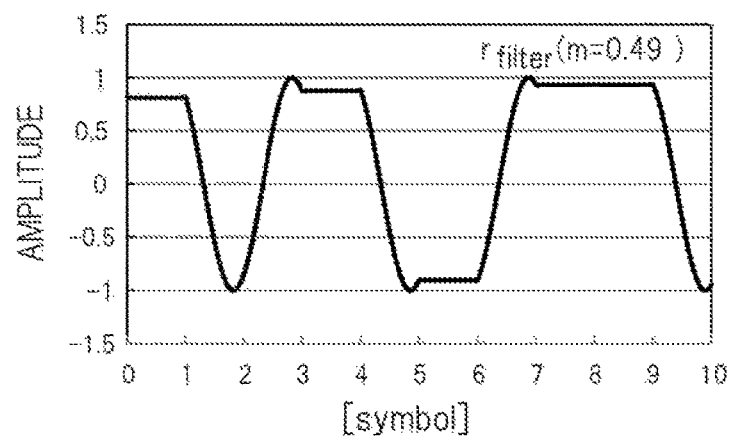
FIGS. 2B and 2C are signal waveform charts of $r_{filter}$(t) when the following conditions: m=0.49 and m=1.49 are satisfied, respectively, in the first embodiment.
Figure 2C:
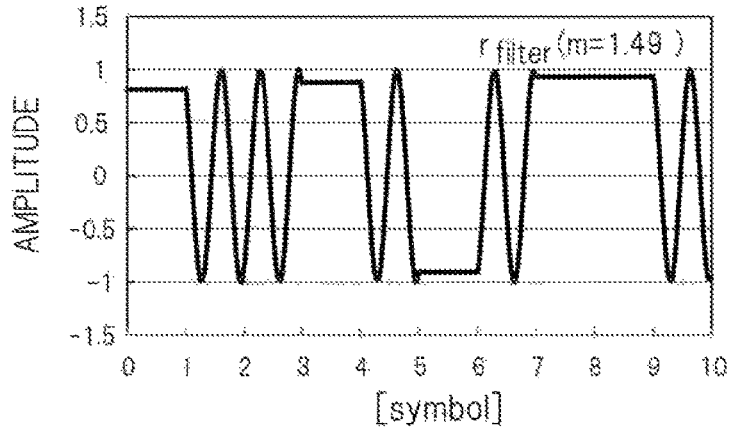

FIG. 2A is a graphical representation of the code string of $a_k$, FIG. 2B is a signal waveform chart of $r_{filter}(t)$ when m=0.49 is satisfied, and FIG. 2C is a signal waveform chart of $r_{filter}(t)$ when m=1.49 is satisfied. In FIGS. 2B and 2C, an initial phase of $r_{filter}(t)$ is set to be 0.2n and the amplitude is normalized to be 1.

As indicated in Expression (10), when the first mixer 3 performs the mixing with the local signal having a frequency shifted by $-\Delta f/2(=f_2)$ from the carrier frequency $f_c$, no phase rotation occurs in the one symbol in a case where the signal is −1 so that a sign becomes identical to a sign of a previous symbol. In a case where the signal is 1, the phase rotates by 0.98π(m=0.49) or rotates by 2.98π(m=1.49) in the one symbol so that the sign becomes opposite to the sign of the previous symbol.

The wave detector 6 compares a sign of the output signal of the first filter 4 and a sign of the signal delayed by one symbol by the delay device 5 and detects whether the signs are the same or opposite so as to distinguish reception data. Note that, for the detection of whether the signs are the same or opposite, a multiplier not illustrated may multiply the two signals to be input and may distinguish whether a result of the multiplication is positive or negative. Alternatively, the signs (positive and negative) of the two signals are previously distinguished and then variations of the signs may be detected.

In this manner, according to the first embodiment, the first mixer 3 mixes the local signal having a frequency shifted by $+\Delta f/2$ or $-\Delta f/2$ from the carrier frequency $f_c$ with the continuous phase frequency shift keying signal so that the wave detector 6 can regard the continuous phase frequency shift keying signal as a differentially coded binary phase shift keying (BPSK) signal. Therefore, during the data demodulation, processing at a subsequent stage of the first mixer 3 can be performed with only an in-phase signal component, and there is no need to perform processing of a quadrature signal component. Thus, the internal configuration of the receiver 1 can be simplified and additionally power consumption can be reduced.

Second Embodiment

According to the first embodiment described above, since processing of adjusting the initial phase is not performed, as illustrated in FIGS. 2B and 2C, an overshoot or an undershoot may occur in the output signal of the first filter 4 upon a switch of the phase of the symbol. Therefore, a second embodiment to be described below is to adjust an initial phase.

Figure 3:
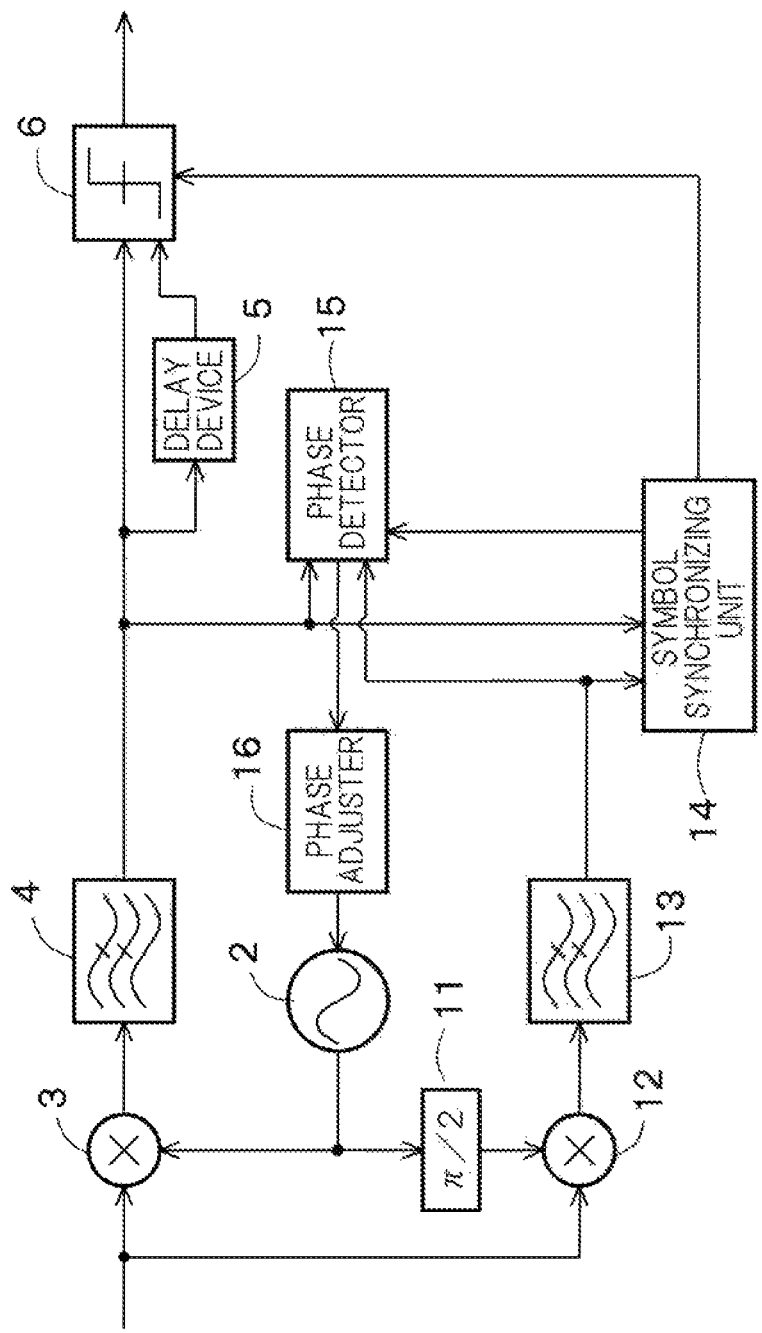
FIG. 3 is a block diagram of an internal configuration of a receiver according to a second embodiment.

FIG. 3 is a block diagram of an internal configuration of a receiver 1 in a radio communication device according to the second embodiment. In FIG. 3, constituent units common with FIG. 1 are denoted with the same reference signs, and differences will be mainly described below.

The receiver 1 in FIG. 3 includes the configuration of the receiver 1 in FIG. 1 and additionally includes a phase shifter 11, a second mixer 12, a second filter 13, a symbol synchronizing unit 14, a phase detector 15, and a phase adjuster 16.

The phase shifter 11 shifts the phase of the local signal generated by the local oscillator 2 by $\pi/2$. The second mixer 12 mixes the continuous phase frequency shift keying signal input to the receiver 1 and an output signal of the phase shifter 11 so as to generate a signal having a phase orthogonal to that of the signal mixed by the first mixer 3. The second filter 13 removes an unnecessary frequency component included in the output signal of the second mixer 12.

The symbol synchronizing unit 14 detects symbol synchronization timing based on the output signal of the first filter 4 and an output signal of the second filter 13. For example, for each data series including a preamble signal and data of a plurality of the symbols, the symbol synchronizing unit 14 detects the symbol synchronizing timing based on the preamble signal. As a more specific method of detecting the synchronization timing, for example, it can be thought that a correlator not illustrated is used so as to calculate a correlation value with respect to a preamble signal series and a peak value of the calculated correlation value is determined to be a synchronization point.

The phase detector 15 detects the phase with the synchronization timing based on the output signals of the first filter 4 and the second filter 13.

The phase adjuster 16 adjusts the phase of the local signal with respect to the local oscillator 2 so that the phase detected by the phase detector 15 becomes 0 or n.

Figure 4A:
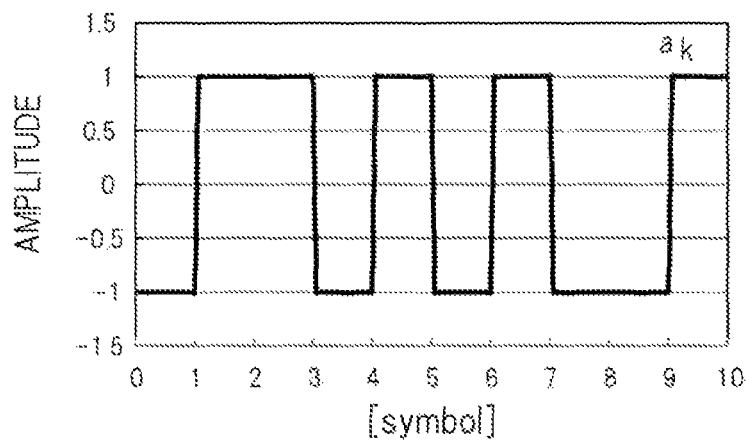
FIG. 4A is a graphical representation of a code string of $a_k$.
Figure 4B:
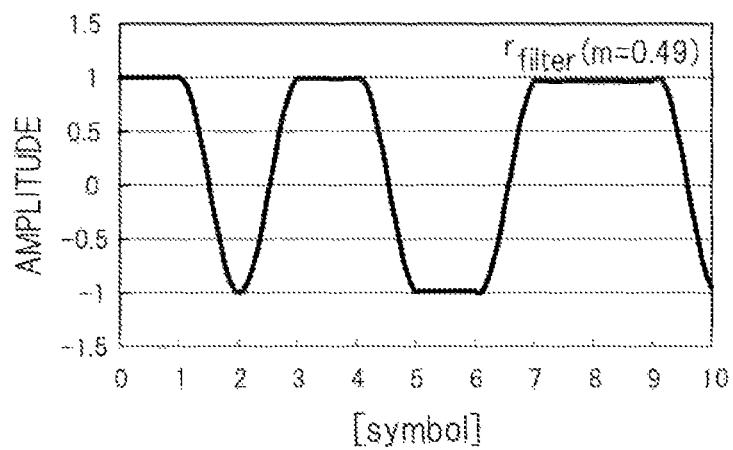
FIGS. 4B and 4C are signal waveform charts of $r_{filter}$(t) when the following conditions: m=0.49 and m=1.49 are satisfied, respectively, in the second embodiment.
Figure 4C:
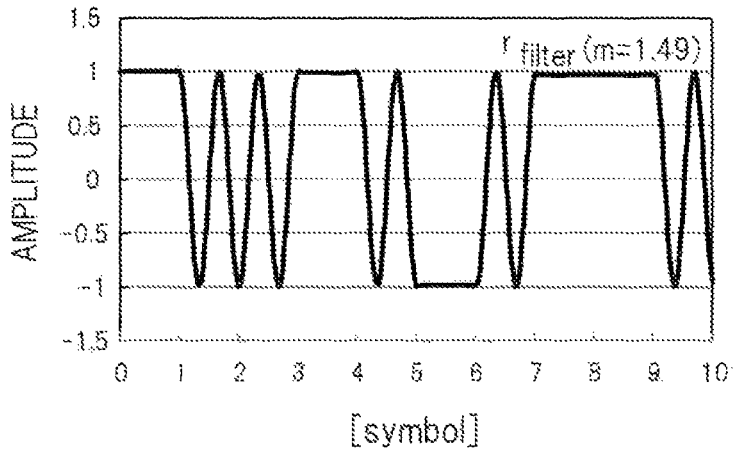

FIG. 4A is a signal waveform of a code string of $a_k$, FIG. 4B is a signal waveform chart of $r_{filter}$ (t) when m=0.49 is satisfied, and FIG. 4C is a signal waveform chart of $r_{filter}$ (t) when m=1.49 is satisfied. In FIGS. 4B and 4C, the initial phase of $r_{filter}$ (t) is set to be 0.2n and amplitude is normalized to be 1.

According to comparison between the waveforms in FIGS. 4B and 4C and the waveforms in FIGS. 2B and 2C, the initial phase is adjusted so that no overshoot and no undershoot occur. That is, this means that a hamming distance widens, and reception characteristics can improve.

Figure 5:
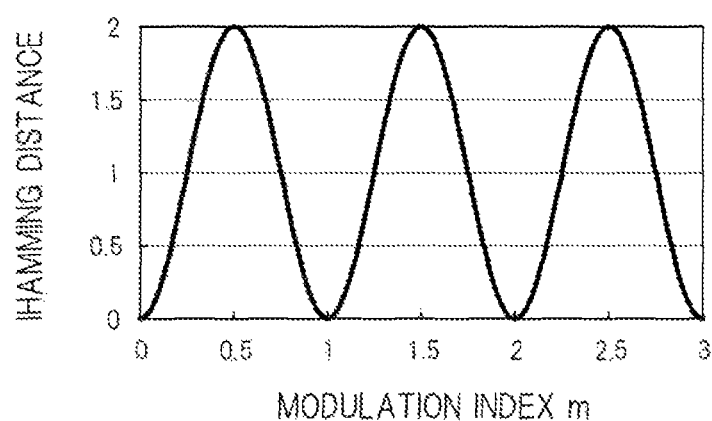
FIG. 5 is a waveform chart of relationship between a modulation index m and a hamming distance in a case where an initial phase is adjusted to be 0.

FIG. 5 is a waveform chart of relationship between a modulation index m and the hamming distance when the initial phase is adjusted to be 0. According to FIG. 5, when the modulation index m is defined to satisfy the following expression: m=0.5+k (k is an integer of 0 or more), the hamming distance becomes maximum, clearly. As the hamming distance lengthens, the reception characteristics improve. Satisfying the following expression: m=0.5+k can maximize the hamming distance and the reception characteristics improve, clearly.

Note that, as the modulation index m becomes smaller, a bandwidth of the signal narrows, and utilization efficiency of the frequency improve. Therefore, m=0.5 is optimum among m=0.5+k (k is an integer of 0 or more). That is, an optimum m in m=n+k (0<n<1, k is an integer of 0 or more) has n=0.5 and k=0.

The receiver 1 in the radio communication device according to the second embodiment, detects a quadrature signal component in order to perform the symbol synchronization. However, once the initial phase is adjusted, data demodulation can be performed with only an in-phase signal component after that. Therefore, power consumption during the data demodulation can be reduced similarly to the first embodiment.

In this manner, according to the second embodiment, the symbol synchronizing unit 14 is provided so as to achieve the symbol synchronization between the in-phase signal component and the quadrature signal component of the continuous phase frequency shift keying signal. Thus, the data demodulation can be performed with the continuous phase frequency shift keying signal regarded as a BPSK signal, by using only the in-phase signal component in a state where the initial phase has been adjusted. Signal processing of the quadrature signal component is used only for the adjustment of the initial phase so that the power consumption during the data demodulation can be reduced similarly to the first embodiment.

Third Embodiment

According to the second embodiment described above, when the modulation index m does not satisfy relationship to m=0.5+k (k is an integer of 0 or more), the phase incompletely shifts for each symbol. When the incompleted shift accumulates, there is a risk that the modulation is incorrectly performed. Therefore, a third embodiment to be described below is to adjust a phase of a local signal in response to a modulation index m.

Figure 6:
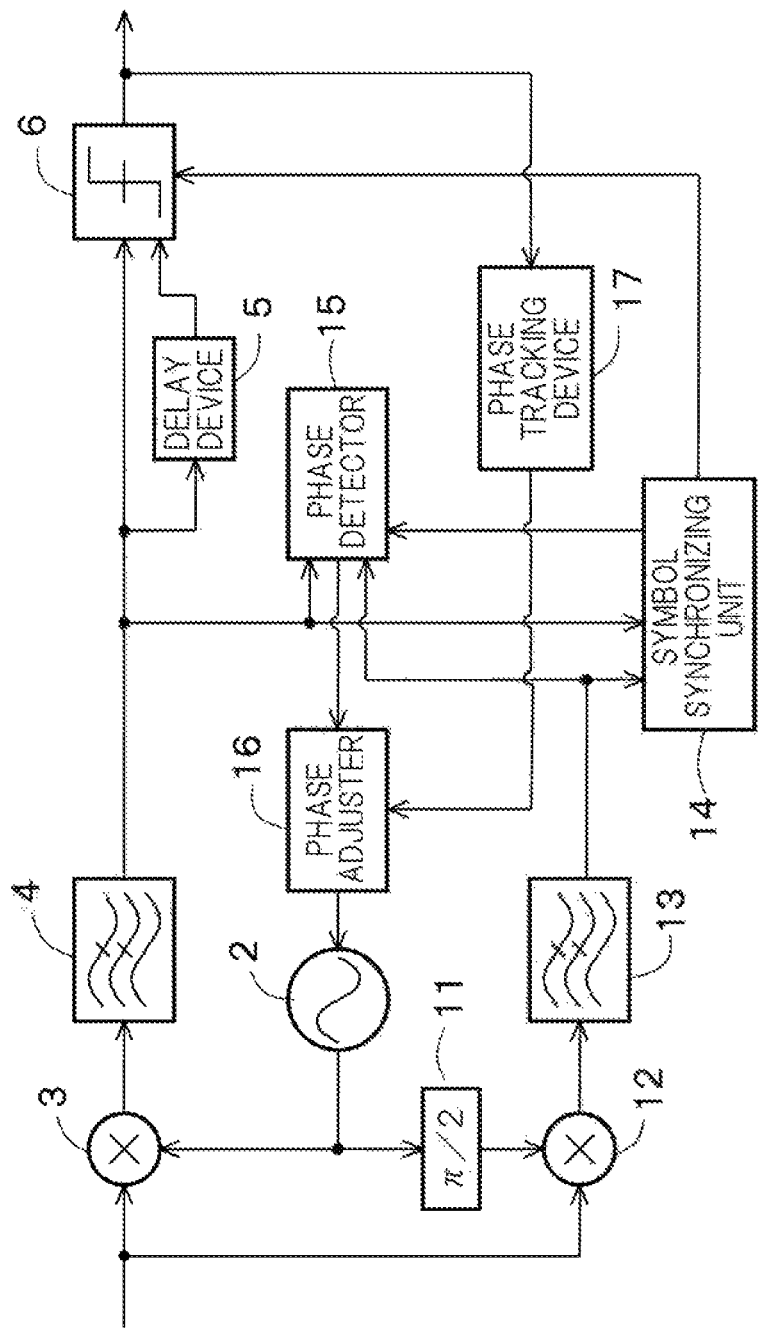
FIG. 6 is a block diagram of an internal configuration of a receiver according to a third embodiment.

FIG. 6 is a block diagram of an internal configuration of a receiver 1 in a radio communication device according to the third embodiment. The receiver 1 in FIG. 6 includes the configuration of the receiver 1 in FIG. 3 and additionally includes a phase tracking device 17.

The phase tracking device 17 in FIG. 6 issues an instruction for phase adjustment by $2\pi \times (0.5-n)$, to the phase adjuster 16 when detecting a variation of the phase of the output signal of the first filter 4 based on the data demodulated by the wave detector 6. More specifically, when $2\pi \times (0.5-n)$ is a positive value, the phase tracking device 17 issues an instruction for advancing the phase having the value, and when a negative value is acquired, the phase tracking device 17 issues an instruction for delaying the phase having the value.

The phase adjuster 16 shifts the phase of the local signal by $2\pi \times (0.5-n)$ to the local oscillator 2 in accordance with the instruction from the phase tracking device 17.

Figure 7A:
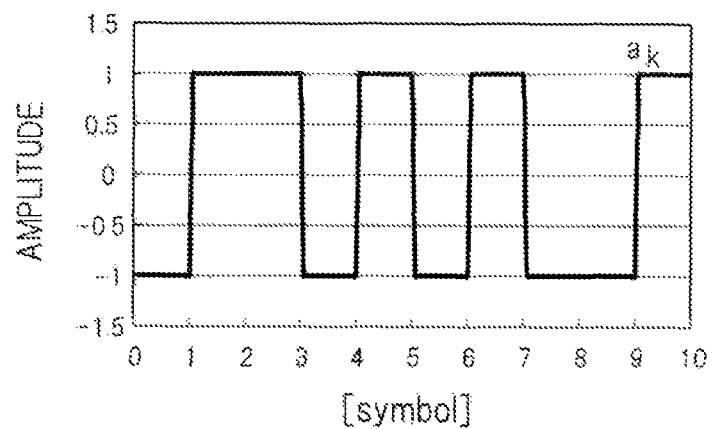
FIG. 7A is a graphical representation of a code string of $a_k$.
Figure 7B:
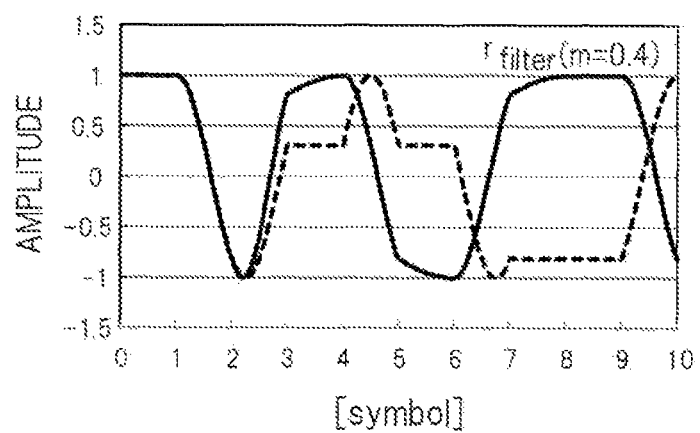
FIG. 7B is a signal waveform chart of $r_{filter}$(t) when the following condition: m=0.4 is satisfied in the third embodiment.

FIG. 7A is a graphical representation of a code string of $a_k$, a broken line waveform of FIG. 7B is a signal waveform chart of $r_{filter}$ (t) when the modulation index m=0.4 is satisfied in a case where no phase tracking device 17 is provided, and a solid line waveform of FIG. 7B is a signal waveform chart of $r_{filter}$ (t) when m=0.4 is satisfied in a case where the phase tracking device 17 is provided.

As indicated with the broken waveform in FIG. 7B, the phase shifts only by 0.8n per symbol when $a_k$=1 is satisfied in a case where m=0.4 is satisfied. Therefore, in a case where $a_k$=1 is satisfied in first to third symbols, $a_k$=0 is satisfied in the third symbol and a fourth symbol, and $a_k$=1 is satisfied in the fourth symbol and a fifth symbol, the data is incorrectly demodulated in the fourth and fifth symbols.

Therefore, the phase tracking device 17 issues the instruction for the phase adjustment by 2π×(0.5−n), to the phase adjuster 16 when detecting $a_k$=1 at which the phase shifts, based on the output data of the wave detector 6. Note that, a value of n can be previously presumed based on a known signal in a preamble signal of a data series. Accordingly, as the solid line waveform in FIG. 7B, the phase shifts by π for each symbol similarly to a case where m=0.5+k is satisfied, and no demodulation error, due to accumulation of a phase error, occurs so that reception characteristics can improve.

As indicated with the solid line waveform in FIG. 7B, when the phase tracking device 17 performs phase tracking processing in a case where m=0.4 is satisfied, the waveform is distorted in comparison to the waveforms illustrated in FIGS. 2B and 4B in a case where m=0.5 is satisfied. However, the phase shift is performed for each symbol similarly to a case where m=0.5 is satisfied, so that possibility of performing the data demodulation correctly is high. Note that, the possibility of performing the data demodulation correctly is low in a case where m<0.4 is satisfied or in a case where m>0.6 is satisfied. Therefore, n in m=n+k (0<n<1, k is an integer of 0 or more) is preferably set to satisfy 0.4≤n≤0.6.

In this manner, according to the third embodiment, the phase tracking device 17 is provided so that the phase can shift for each symbol even in a case where m=0.5+k is not satisfied, similarly to a case where m=0.5+k is satisfied. Thus, no demodulation error, due to the accumulation of the phase error, occurs so that the reception characteristics can improve.

According to each of the first to third embodiments described above, an example of the continuous phase frequency shift keying signal input to the receiver 1, being the GMSK signal, has been described. However, a continuous phase frequency shift keying (CPFSK) signal may be input to the receiver 1 except the GMSK signal. The receiver 1 in the radio communication device according to each of the embodiments, can perform the demodulation processing with the CPFSK signal regarded as the BPSK signal.

Fourth Embodiment

The configuration and operation of the receiver 1 have been described in each of the first to third embodiments described above. In a fourth embodiment to be described below, an exemplary hardware configuration of a radio communication device including any of the configurations of the receivers 1 according to the first to third embodiments and additionally including a transmitter, will be described below. The receiver 1 in the radio communication device according to the fourth embodiment, includes any of the first to third embodiments described above, and thus the detailed descriptions thereof will be omitted.

Figure 8:
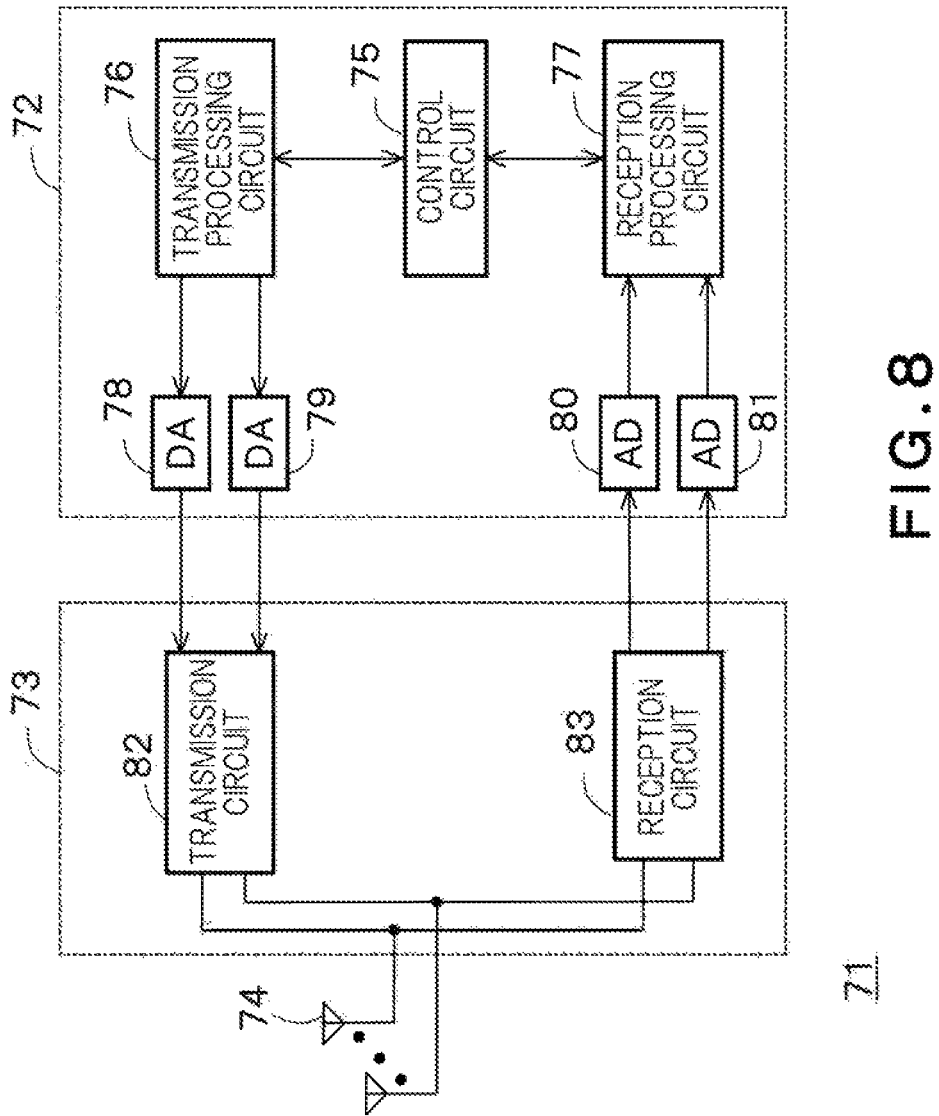
FIG. 8 is a block diagram of a schematic configuration of a radio communication device according to a fourth embodiment.

FIG. 8 is a block diagram of a schematic configuration of the radio communication device 71 according to the fourth embodiment. The radio communication device 71 in FIG. 8 includes a baseband unit 72, an RF unit 73, and an antenna unit 74.

The baseband unit 72 includes a control circuit 75, a transmission processing circuit 76, a reception processing circuit 77, DA converters 78 and 79, and AD converters 80 and 81. The control circuit 75, the transmission processing circuit 76, and the reception processing circuit 77 inside the baseband unit 72 each perform digital signal processing. The DA converters 78 and 79 each convert a digital transmission signal generated by the transmission processing circuit 76, into an analog transmission signal, and supply the analog transmission signal to the RF unit 73. The reception processing circuit 77 performs, for example, demodulation processing to a digital reception signal converted by each of the AD converters 80 and 81.

The transmission side and the reception side individually include a double-channel signal line in FIG. 8. This is because transmission and reception processing is performed with an I signal and a Q signal separated. For example, the DA converter 78 converts a digital I signal into an analog I signal, and the DA converter 79 converts a digital Q signal into an analog Q signal. Note that, the local oscillator 2 may be directly modulated with a single-channel signal remaining instead of the quadrature modulation, and then transmission may be performed. In this case, when a voltage controlled oscillator (VCO) is used for the local oscillator 2, only one DA converter is at least provided. When a digital controlled oscillator (DCO) is used for the local oscillator 2, no DA converter is required. When an one-channel or multiple-channel transmission signal is distributed by the number of the antenna units 74 so as to be transmitted, a number of DA converters corresponding to the number of the antenna units 74 may be provided.

The control circuit 75 performs, for example, processing of a media access control (MAC) layer. The control circuit 75 may perform processing of a host network hierarchy of the MAC layer. The control circuit 75 may perform processing relating to multi-input multi-output (MIMO). For example, the control circuit 75 may perform, for example, propagation path estimation processing, transmission weight calculation processing, and stream separation processing.

The transmission processing circuit 76 generates the digital transmission signal. The reception processing circuit 77 performs processing of analyzing a preamble and a physical header, for example, after performing the demodulation and decoding. The reception processing circuit 77 includes the delay device 5, the wave detector 6, the symbol synchronizing unit 14, and the phase detector 15 illustrated in FIG. 3. Similarly, the AD converter 79 in FIG. 8 is coupled to, for example, an output node of the second filter 13 in FIG. 3.

The RF unit 73 includes a transmitting circuit 82 and a receiving circuit 83. The transmitting circuit 82 includes, for example, a transmission filter not illustrated that extracts a signal in a transmission band, a mixer not illustrated that upconverts the signal that has passed through the transmission filter, into a radio communication frequency, and an amplifier that amplifies the signal that has been upconverted. The receiving circuit 83 includes a mixer that downconverts a signal received by the antenna, that has been amplified, and a reception filter that extracts a signal in a desired frequency band from an output signal of the mixer.

In a case where the transmission and reception of a radio communication signal are performed through one antenna, a switch that couples any one of the transmitting circuit 82 and the receiving circuit 83, to the one antenna, may be provided in the RF unit 73. When this type of switch is provided, the one antenna can be coupled to the transmitting circuit 82 during the transmission, and the one antenna can be coupled to the receiving circuit 83 during the reception.

The RF unit 73 and the baseband unit 72 illustrated in FIG. 8 may be made on one chip (an integrated circuit), or the RF unit 73 and the baseband unit 72 may be individually made on a separate chip. The RF unit 73 and the baseband unit 72 may partially include a discrete component, and the remaining may include one or a plurality of chips.

Furthermore, the RF unit 73 and the baseband unit 72 may include a software radio configurable with software. In this case, a digital signal processing processor is used so that functions of the RF unit 73 and the baseband unit 72 are at least achieved with the software. In this case, a bus, the processor, and an external interface unit are provided inside the radio communication device 71 illustrated in FIG. 8. The processor and the external interface unit are coupled through the bus, and firmware operates in the processor. The firmware can be updated with a computer program. The processor operates the firmware so that processing operation of the RF unit 73 and the baseband unit 72 illustrated in FIG. 8 can be performed.

The radio communication device 71 illustrated in FIG. 8 includes a plurality of the antenna units 74, but the number of the antenna units 74 is not particularly limited and may be one. In this case, a transmission and reception changeover switch at least switches transmission and reception of the one antenna.

The radio communication device 71 illustrated in FIG. 8 can be applied to a stationary radio communication device 71, such as an access point, a wireless router, or a computer, can be applied to a portable radio terminal, such as a smartphone or a mobile phone, can be applied to peripheral equipment, such as a mouse or a keyboard, that performs radio communication with a host device, can be applied to a card-typed member including a radio function built therein (an IC card, a memory card, or a SIM card), or can be applied to a wearable terminal that performs radio communication of biological information. Various examples of a radio system of the radio communication between the radio communication devices 71 illustrated in FIG. 8, that can be applied, include, but are not particularly limited, third generation or later cellular communication, a wireless LAN, Bluetooth (registered trademark), and near-field radio communication.

Figure 9:
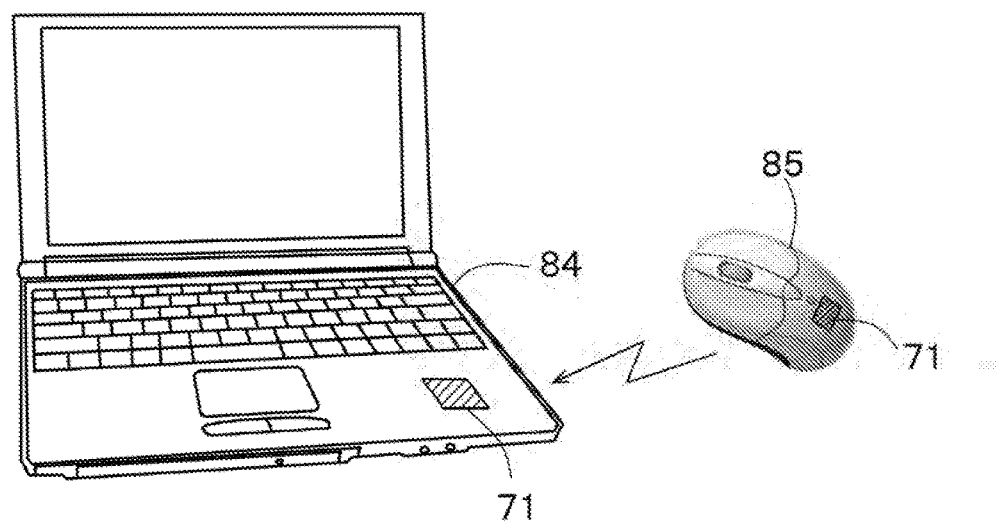
FIG. 9 is a view of exemplary radio communication between a PC and a mouse.

FIG. 9 illustrates exemplary performance of radio communication between a PC 84 being a host device and a mouse 85 being peripheral equipment. Both of the PC 84 and the mouse 85 include the radio communication device 71 illustrated in FIG. 8 built therein. The mouse 85 uses power of a built-in battery so as to perform the radio communication, and is required to perform the radio communication with power consumption as low as possible because a space in which the battery is built is limited. Accordingly, using a radio system capable of low consumption radio communication, such as Bluetooth Low Energy decided in a standard of Bluetooth (registered trademark) 4.0, preferably performs the radio communication.

Figure 10:
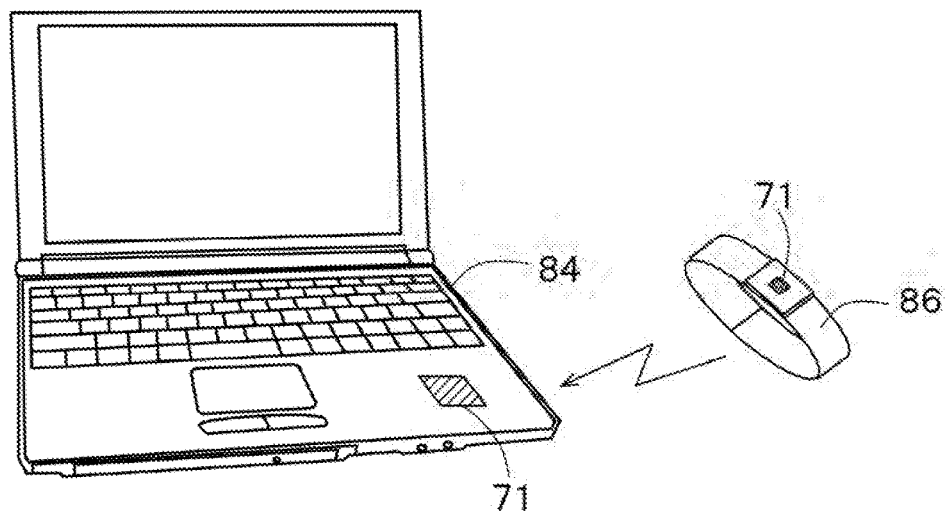
FIG. 10 is a view of exemplary radio communication between the PC and a wearable terminal.

FIG. 10 illustrates exemplary performance of radio communication between a wearable terminal 86 and a host device (for example, the PC 84). The wearable terminal 86 is to be worn on a body of a person, and various examples thereof may include a seal type to be worn on a body, an eyeglasses type and an earphone type to be worn on a body except arms, and a pacemaker to be inserted inside a body, in addition to a type to be worn on an arm illustrated in FIG. 10. Both of the wearable terminal 86 and the PC 84 in FIG. 10 also include the radio communication device 71 illustrated in FIG. 8 built therein. Note that, examples of the PC 84 include a computer and a server. The above radio system capable of the radio communication with low power consumption, such as Bluetooth Low Energy, is also preferably adopted because the wearable terminal 86 is worn on a body of a person and a space for a built-in battery is limited.

When the radio communication is performed between the radio communication devices 71 illustrated in FIG. 8, the type of information to be transmitted and received through the radio communication is not limited. Note that, the radio system is preferably varied between a case where information including a large amount of data, such as moving image data, is transmitted and received and a case where information including a small amount of data, such as operation information of the mouse 85, is transmitted and received. Thus, there is a need to perform the radio communication in an optimum radio system in response with the amount of information to be transmitted and received.

Furthermore, when the radio communication is performed between the radio communication devices 71 illustrated in FIG. 8, a notifying unit that notifies a user of an operation state of the radio communication, may be provided. Specific examples of the notifying unit may include display of the operation state on a display device including LEDs, notification of the operation state by vibration of a vibrator, and notification of the operation state from audio information by a speaker or a buzzer.

The receivers 1 described in the respective embodiments described above, may at least partially include hardware or include software. When the configuration including the software is provided, a program for achieving a function of the at least partial receivers 1 may be stored in a storage medium, such as a flexible disk or a CD-ROM, and then may be read and performed by a computer. The storage medium is not limited to a detachably attachable storage medium, such as a magnetic disk or an optical disc, and may be a non-removable storage medium, such as a hard disk or a memory.

The program for achieving the function of the at least partial receivers 1, may be distributed through a communication line, such as the Internet, (including radio communication). Furthermore, the program that has been encrypted, modulated, or compressed, may be distributed through a wired line or a wireless line, such as the Internet, or may be stored in a storage medium and then may be distributed.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:
1. A radio communication device comprising:
a local oscillator to generate a local signal;
a first mixer to mix a binary continuous phase frequency shift keying signal and the local signal so as to generate a baseband signal;
a first filter to remove an unnecessary frequency component included in the baseband signal;

a delay circuitry to delay an output signal of the first filter by one symbol; and a wave detector to demodulate the phase-continuous frequency shift keying signal by using the output signal of the first filter and an output signal of the delay circuitry, wherein a modulation index m of the phase-continuous frequency shift keying signal is a value expressed by m=n+k where 0<n<1 is satisfied and k is an integer of 0 or more, a frequency of the local signal is a frequency shifted by a frequency corresponding to 0 or 1 of the continuous phase frequency shift keying signal, from a carrier frequency of the continuous phase frequency shift keying signal, the output signal of the first filter is a signal including a phase that remains when the continuous phase frequency shift keying signal is one of 0 and 1 and that shifts by $\pi$ when the signal is another, for each symbol.

2. The radio communication device according to claim 1, wherein the continuous phase frequency shift keying signal is a signal including a phase that varies by $\pi/2$ when the continuous phase frequency shift keying signal is one of 0 and 1 and a phase that varies by $-\pi/2$ when the signal is another, for each symbol.

3. The radio communication device according to claim 1, further comprising:
a phase shifter to shift a phase of the local signal by $\pi/2$;
a second mixer to mix the continuous phase frequency shift keying signal and an output signal of the phase shifter so as to generate a signal having a phase orthogonal to a phase of the signal mixed by the first mixer;
a second filter to remove an unnecessary frequency component included in the output signal of the second mixer;
a symbol synchronizing circuitry to detect symbol synchronization timing based on the output signal of the first filter and an output signal of the second filter;
a phase detector to detect the phase with synchronization timing based on the output signals of the first filter and the second filter; and
a phase adjuster to adjust the phase of the local signal with respect to the local oscillator such that the phase detected by the phase detector becomes 0 or $\pi$.

4. The radio communication device according to claim 3, wherein the symbol synchronizing circuitry is to detect the synchronization timing based on a preamble signal, for each data series including the preamble signal and data of a plurality of symbols.

5. The radio communication device according to claim 3, further comprising:
a phase tracking circuitry to issue an instruction for phase adjustment by $2\pi\times(0.5-n)$, to the phase adjuster when detecting a variation of a phase of the output signal of the first filter based on data demodulated by the wave detector,
wherein the phase adjuster shifts the phase of the local signal by $2\pi\times(0.5-n)$, to the local oscillator, in accordance with the instruction from the phase tracking circuitry.

6. The radio communication device according to claim 1, wherein the n is a value in the following range: $0.4 \leq n \leq 0.6$.

7. The radio communication device according to claim 1, wherein the n is 0.5.

8. The radio communication device according to claim 1, wherein the k is 0.

9. The radio communication device according to claim 1, wherein the m is 0.5.

10. The radio communication device according to claim 1, further comprising:
an integrated circuit including the local oscillator, the first mixer, the first filter, the delay circuitry, and the wave detector.

11. The radio communication device according to claim 1, further comprising:
at least one antenna.

12. A radio communication device comprising:
an RF circuitry including a receiving circuit; and
a baseband circuitry including a reception processing circuit,
wherein the receiving circuit comprises:
a local oscillator to generate a local signal;
a first mixer to mix a binary continuous phase frequency shift keying signal and the local signal so as to generate a baseband signal; and
a first filter to remove an unnecessary frequency component included in the baseband signal,
the reception processing circuit comprises:
a delay circuitry to delay an output signal of the first filter by one symbol; and
a wave detector to demodulate the continuous phase frequency shift keying signal by using the output signal of the first filter and an output signal of the delay circuitry,
a modulation index m of the continuous phase frequency shift keying signal is a value expressed by m=n+k where 0<n<1 is satisfied and k is an integer of 0 or more,
a frequency of the local signal is a frequency shifted by a frequency corresponding to 0 or 1 of the continuous phase frequency shift keying signal, from a carrier frequency of the continuous phase frequency shift keying signal,
the output signal of the first filter is a signal including a phase that remains when the continuous phase frequency shift keying signal is one of 0 and 1 and that shifts by $\pi$ when the signal is another, for each symbol.

13. A radio communication method comprising:
generating a baseband signal by mixing a binary continuous phase frequency shift keying signal and a local signal generated by a local oscillator;
removing an unnecessary frequency component included in the baseband signal, by a first filter;
delaying an output signal of the first filter by one symbol by a delay circuitry; and
demodulating the continuous phase frequency shift keying signal by using the output signal of the first filter and an output signal of the delay circuitry,
wherein a modulation index m of the continuous phase frequency shift keying signal is a value expressed by m=n+k where 0<n<1 is satisfied and k is an integer of 0 or more,
a frequency of the local signal is a frequency shifted by a frequency corresponding to 0 or 1 of the continuous phase frequency shift keying signal, from a carrier frequency of the continuous phase frequency shift keying signal,
the output signal of the first filter is a signal including a phase that remains when the continuous phase frequency shift keying signal is one of 0 and 1 and that shifts by $\pi$ when the signal is another, for each symbol.

14. The radio communication method according to claim 13, wherein the continuous phase frequency shift keying signal is a signal including a phase that varies by $\pi/2$ when the continuous phase frequency shift keying signal is one of 0 and 1 and a phase that varies by $-\pi/2$ when the signal is another, for each symbol.

15. The radio communication method according to claim 13, further comprising:

shifting a phase of the local signal by $\pi/2$;

mixing the continuous phase frequency shift keying signal and the shifted signal so as to generate a signal having a phase orthogonal to a phase of the signal mixed by the first mixer;

removing an unnecessary frequency component included in the orthogonal signal;

detecting symbol synchronization timing by a symbol synchronizing circuitry based on the output signal of the first filter and an output signal of the second filter;

detecting the phase with synchronization timing based on the output signals of the first filter and the second filter; and adjusting the phase of the local signal with respect to the local oscillator such that the detected phase becomes 0 or $\pi$.

16. The radio communication method according to claim 15, wherein the symbol synchronizing circuitry is to detect the synchronization timing based on a preamble signal, for each data series including the preamble signal and data of a plurality of symbols.

17. The radio communication method according to claim 15, further comprising:

issuing an instruction for phase adjustment by $2\pi \times (0.5-n)$ when detecting a variation of a phase of the output signal of the first filter based on data demodulated by the wave detector, wherein the phase of the local signal in the local oscillator is shifted by $2\pi \times (0.5-n)$, in accordance with the instruction.

18. The radio communication method according to claim 13, wherein the n is a value of $0.4 \leq n \leq 0.6$.

* * * * *